United States Patent
Kim et al.

(10) Patent No.: US 11,367,911 B2
(45) Date of Patent: Jun. 21, 2022

(54) CYLINDRICAL BATTERY CELL HAVING HEAT-SHRINKABLE TUBE COMPRISING ULTRAVIOLET STABILIZER

(71) Applicant: LG Chem, Ltd., Seoul (KR)

(72) Inventors: Jun-Tak Kim, Daejeon (KR); Je-Jun Lee, Daejeon (KR); Kwang-Su Hwang Bo, Daejeon (KR); Sang-Sok Jung, Daejeon (KR); Gil-Young Lee, Daejeon (KR)

(73) Assignee: LG Energy Solution, Ltd.

( * ) Notice: Subject to any disclaimer, the term of this patent is extended or adjusted under 35 U.S.C. 154(b) by 113 days.

(21) Appl. No.: 16/461,223

(22) PCT Filed: Dec. 26, 2017

(86) PCT No.: PCT/KR2017/015431
§ 371 (c)(1),
(2) Date: May 15, 2019

(87) PCT Pub. No.: WO2018/124674
PCT Pub. Date: Jul. 5, 2018

(65) Prior Publication Data
US 2019/0280252 A1    Sep. 12, 2019

(30) Foreign Application Priority Data

Dec. 26, 2016  (KR) .................. 10-2016-0178714
Dec. 26, 2017  (KR) .................. 10-2017-0179163

(51) Int. Cl.
*H01M 50/10* (2021.01)
*H01M 50/107* (2021.01)
(Continued)

(52) U.S. Cl.
CPC .......... *H01M 50/107* (2021.01); *B32B 15/08* (2013.01); *B32B 27/30* (2013.01); *C08K 5/105* (2013.01);
(Continued)

(58) Field of Classification Search
CPC .......... H01M 10/0525; H01M 50/107; H01M 10/0587; H01M 10/42; H01M 50/10;
(Continued)

(56) References Cited

U.S. PATENT DOCUMENTS 6,843,939 B2   1/2005   Stretanski et al.
9,209,443 B2   12/2015  L'Abee et al.
(Continued)

FOREIGN PATENT DOCUMENTS

CN   1798538 A    7/2006
JP   H06128423 A  5/1994
(Continued)

OTHER PUBLICATIONS

Extended European Search Report including Written Opinion for EP17888526.5 dated Oct. 31, 2019.
(Continued)

*Primary Examiner* — Milton I Cano
*Assistant Examiner* — Jenna Shulman
(74) *Attorney, Agent, or Firm* — Lerner, David, Littenberg, Krumholz & Mentlik, LLP

(57) ABSTRACT

Disclosed is a cylindrical battery cell in which a heat-shrinkable tube wraps an outer surface of a cylindrical case of the cylindrical battery cell except electrode terminals, the heat-shrinkable tube including: a base material, which is a polyester resin, capable of shrinking by heat; a supplement, which is a nylon resin, capable of increasing a tensile strength and operating temperature of the heat-shrinkable tube; and an ultraviolet stabilizer capable of inhibiting a
(Continued)

chain reaction of free radicals generated by cleavage of polymer chains of the nylon resin or the polyester resin, when the heat-shrinkable tube is exposed to an ultraviolet ray irradiation.

9 Claims, 5 Drawing Sheets

(51) Int. Cl.
  *B32B 15/08*   (2006.01)
  *B32B 27/30*   (2006.01)
  *H01M 10/0525*   (2010.01)
  *H01M 10/0587*   (2010.01)
  *C08K 5/105*   (2006.01)
  *H01M 10/42*   (2006.01)
  *C08L 67/03*   (2006.01)
  *C08K 5/132*   (2006.01)
  *C08L 77/02*   (2006.01)
  *H01M 50/24*   (2021.01)

(52) U.S. Cl.
  CPC .............. *C08K 5/132* (2013.01); *C08L 67/03* (2013.01); *C08L 77/02* (2013.01); *H01M 10/0525* (2013.01); *H01M 10/0587* (2013.01); *H01M 10/42* (2013.01); *H01M 50/10* (2021.01); *H01M 50/24* (2021.01); *Y02E 60/10* (2013.01)

(58) Field of Classification Search
  CPC ........ H01M 50/24; B32B 15/08; B32B 27/30; C08K 5/105; C08K 5/132; C08L 67/03; C08L 77/02; Y02E 60/10
  See application file for complete search history.

(56) References Cited

U.S. PATENT DOCUMENTS

| | | |
|---|---|---|
| 2002/0150751 A1 | 10/2002 | Murschall et al. |
| 2003/0064195 A1 | 4/2003 | Murschall et al. |
| 2003/0162868 A1 | 8/2003 | Stretanski et al. |
| 2004/0247536 A1 | 12/2004 | Chaudhuri |
| 2005/0049337 A1 | 3/2005 | Stretanski et al. |
| 2007/0059258 A1 | 3/2007 | Chaudhuri |
| 2009/0275251 A1 | 11/2009 | Bonnet et al. |
| 2011/0192564 A1 | 8/2011 | Mommer et al. |
| 2012/0196171 A1 | 8/2012 | Ikishima et al. |
| 2014/0193716 A1 | 7/2014 | L'Abee et al. |
| 2015/0111092 A1 | 4/2015 | Janousek et al. |
| 2016/0226114 A1 | 8/2016 | Hartmann et al. |
| 2017/0232721 A1 | 8/2017 | Lim et al. |

FOREIGN PATENT DOCUMENTS

| | | |
|---|---|---|
| JP | H0982292 A | 3/1997 |
| JP | 20030528748 A | 9/2003 |
| JP | 2005105119 A | 4/2005 |
| JP | 2007323907 A | 12/2007 |
| JP | 2008277062 A | 11/2008 |
| JP | 2009167259 A | 7/2009 |
| JP | 2009241457 A | 10/2009 |
| JP | 2012156027 A | 8/2012 |
| JP | 2012209061 A | 10/2012 |
| JP | 2013056547 A | 3/2013 |
| JP | 2014231564 A | 12/2014 |
| KR | 20010082719 A | 8/2001 |
| KR | 20120104592 A | 9/2012 |
| KR | 20140069419 A | 6/2014 |
| KR | 20160016006 A | 2/2016 |
| KR | 20160022090 A | 2/2016 |
| WO | 03060001 A2 | 7/2003 |
| WO | 2014108863 A2 | 7/2014 |

OTHER PUBLICATIONS

Search report from International Application No. PCT/KR2017/015431, dated Jun. 26, 2018.
Search Report from Office Action for Chinese Application No. 201780074872.4 dated Jun. 3, 2021; 3 pages.
Sui Zhaode, Li Jie, Zhang Yujie. Light stabilizer and its application technology[M]. Beijing:China Light Industry Press, 2010; p. 123.
Xianliang Zhang, Xinlan Chen, Hognding Tang, "Fine Chemicals Chemistry," 2nd Edition, Feb. 29, 2009, Wuhan University Press, pp. 232-234.

10

PRIOR ART

|  | Before irradiated with UV | After irradiated with UV |
|---|---|---|
| Entire photo | | |
| Partially enlarged photo | | |

| | Before irradiated with UV | After irradiated with UV |
|---|---|---|
| Entire photo | | |
| Partially enlarged photo | | |

CYLINDRICAL BATTERY CELL HAVING HEAT-SHRINKABLE TUBE COMPRISING ULTRAVIOLET STABILIZER

CROSS-REFERENCE TO RELATED APPLICATIONS

The present application is a national phase entry under 35 U.S.C. § 371 of International Application No. PCT/KR2017/015431 filed on Dec. 26, 2017, which claims priority from Korean Patent Application No. 10-2016-0178714, filed on Dec. 26, 2016, the contents of which are entirely incorporated herein by reference.

TECHNICAL FIELD

The present invention relates generally to a cylindrical battery cell having a heat-shrinkable tube comprising an ultraviolet stabilizer.

BACKGROUND ART

As energy source prices are increasing due to depletion of fossil fuels and because interest in environmental pollution has escalated recently, demand for environmentally-friendly alternative energy sources is bound to play an increasing role in future life. Thus, research into various power generation techniques, such as nuclear energy, solar energy, wind energy, tidal power, and the like, is being conducted, and power storage devices for more efficient use of the generated energy are also drawing much attention.

In particular, demand for batteries as an energy source has been rapidly increased as technology development and demand with respect to mobile devices has increased. In addition, secondary batteries have recently been used as power sources for electric vehicles (EVs), hybrid electric vehicles (HEVs), etc., and the market for secondary batteries continues to expand to applications such as auxiliary power suppliers through grid technology. As a result, a significant amount of research into batteries that can meet various demands has been conducted.

In general, secondary batteries are classified according to shapes of battery cases into a cylindrical or prismatic battery including an electrode assembly in a cylindrical or prismatic metal can, and a pouch type battery including an electrode assembly in a pouch type case made of an aluminum laminate sheet. Here, an electrode assembly mounted in a battery case serves as a power generating element having a positive electrode, separator, negative electrode stack structure, which can be charged and discharged. The electrode assembly is mainly classified as a jelly roll type electrode assembly configured to have a structure in which a long sheet type positive electrode and a long sheet type negative electrode, to which active materials are applied, are wound in a state in which a separator is interposed therebetween, and a stacked type electrode assembly configured to have a structure in which a plurality of positive electrodes having a predetermined size and a plurality of negative electrodes are sequentially stacked in a state in which separators are interposed respectively therebetween.

FIG. 1 is a vertical cross-sectional perspective view showing a conventional cylindrical secondary battery.

Referring to FIG. 1, the cylindrical secondary battery 10 is manufactured by mounting a jelly-roll type (wound-type) electrode assembly 10 in a cylindrical case 13, injecting an electrolyte into the cylindrical case 13, and coupling a cap assembly 14 having an electrode terminal (for example, a positive electrode terminal) to an upper end, which is open, of the cylindrical case 13.

In the cylindrical secondary battery, a tube is formed to wrap an outer surface of the battery case in order to insulate from an outer conductive material and to protect an exterior of the battery, the tube made of a film that is an electrically insulating plastic material.

However, conventional tubes for cylindrical secondary batteries have problems that when exposed to ultraviolet rays (UV) for a long time, the films are damaged or discolored, which means that the inherent insulating function is lost and it is impossible to protect exteriors of batteries.

Furthermore, when exposed to high temperature or external impact after tubes are attached to outer surfaces of battery cases of cylindrical secondary batteries, the tubes are easily deformed, thereby causing defects.

Accordingly, there is an increasing need for a technology capable of solving the above problems.

DISCLOSURE

Technical Problem

The present invention has been made to solve the above problems and other technical problems that have yet to be resolved.

As a result of a variety of extensive and intensive studies and experiments to solve the problems described above, the inventors of the present invention confirmed that, as described below, when a heat-shrinkable tube includes an ultraviolet stabilizer (UV stabilizer) that inhibits a chain reaction of free radicals generated by cleavage of a polymer chain of a nylon resin and a polyester resin in which the polymer chain is cut by an ultraviolet ray irradiated to the heat-shrinkable tube, desired effects may be obtained, thus completing the present invention.

Technical Solution

In order to achieve the above objective, according to one aspect of the present invention, there is provided a cylindrical battery cell in which a heat-shrinkable tube wraps an outer surface of a cylindrical case of the cylindrical battery cell except electrode terminals, the heat-shrinkable tube including:

a base material, which is a polyester resin, shrinking by heat;

a supplement, which is a nylon resin, increasing tensile strength and operating temperature of the heat-shrinkable tube; and an ultraviolet stabilizer inhibiting a chain reaction of free radicals generated by cleavage of polymer chains of the nylon resin and the polyester resin, the polymer chain cut by an ultraviolet ray irradiating the heat-shrinkable tube.

Therefore, since the cylindrical battery cell according to the present invention includes the UV stabilizer that inhibits the chain reaction of free radicals generated by cleavage of a polymer chain of the nylon resin and the polyester resin in which the polymer chain is cut by ultraviolet rays irradiating the heat-shrinkable tube, the tube is not damaged or discolored even when the heat-shrinkable tube is exposed to ultraviolet rays for a long time, which means that the inherent insulating function of the tube can be maintained and the exterior of the battery can be protected.

In addition, the heat-shrinkable tube of the cylindrical battery cell according to the present invention includes the supplement, which is the nylon resin, that increases the tensile strength and operating temperature of the heat-shrinkable tube whereby when exposed to a high temperature or external impact deformation of the tube can be prevented.

The heat-shrinkable tube may further include a coloration pigment whereby a capacity of the battery cell, and the like can be distinguished and displayed by color, so that it is easy to sort and distinguish batteries.

In a concrete example, the polyester resin may be a polyethylene terephthalate resin.

Preferably, the polyester resin may be included in an amount of 70 wt % to 90 wt %, based on the total weight of the heat-shrinkable tube. Specifically, when the polyester resin is included in an amount of less than 70 wt %, it is difficult to obtain a required heat shrinkage ratio of the present invention, and thus it is difficult to exhibit the function of the heat-shrinkable tube. On the other hand, when the polyester resin is included in an amount of more than 90 wt %, the tube is easily deformed or deteriorated when exposed to a high temperature.

In a preferred embodiment, the heat-shrinkable tube for the cylindrical battery cell may be 1 µm to 100 µm in thickness.

In another preferred embodiment, the UV stabilizer may be a benzoate-based compound. Preferably, the benzoate-based compound may be butyl-4-hydroxybenzoate.

In addition, the UV stabilizer may be included in an amount of 0.1 wt % to 5 wt %, based on the total weight of the tube. Preferably, the UV stabilizer is included in an amount of 0.5 wt % to 5 wt %. More specifically, when the UV stabilizer is included in an amount of less than 0.1 wt %, it is difficult to exhibit the function of the ultraviolet stabilizer that inhibits the chain reaction of the generated free radical, whereby it is difficult to prevent cracking occurring due to ultraviolet irradiation. On the other hand, when the UV stabilizer is included in an amount exceeding 5 wt %, the UV stabilizer, which is expensive, is excessively added such that the manufacturing cost is excessively increased as compared with the ultraviolet stabilizing effect.

In a preferred embodiment, the nylon resin may be nylon 66. The nylon 66 has a high heat deflection temperature, which is 70 celsius degrees, 105 celsius degrees of a heat resistance temperature, $2.9 \times 10^4$ kg/cm$^2$ of a tensile modulus, and $3.0 \times 10^4$ kg/cm$^2$ of a flexural modulus. Compared to other nylon 6, nylon 6-10 and nylon 6-12, nylon 66 has higher heat resistance and higher mechanical strength.

In addition, the nylon resin may be included in an amount of 3 wt % to 10 wt %, based on the total weight of the heat-shrinkable tube.

In addition, the nylon resin may be included in the polyester resin as a blended state.

In a preferred embodiment, the pigment may be included in an amount of 10 wt % to 20 wt %, based on the total weight of the heat-shrinkable tube.

In another preferred embodiment, the heat-shrinkable tube may have no cracking when irradiated for 1,000 hours at an intensity of 61.5 W/m$^2$ and at a wavelength of 300 nm to 400 nm.

In a preferred embodiment, the heat-shrinkable tube may further include an ultraviolet absorber that absorbs radiated ultraviolet rays and emits the absorbed energy as heat energy. Preferably, the ultraviolet absorber may be a benzophenone-based compound.

Therefore, in the heat-shrinkable tube according to the present invention, the UV stabilizer can prevent cracking of the film. In addition, since the heat-shrinkable tube according to the present invention further includes the ultraviolet absorber that absorbs irradiated ultraviolet rays and emits the absorbed energy as heat energy, oxidation (decomposition) of the tube material with oxygen can be inhibited whereby deterioration of the tube due to ultraviolet rays can be prevented for a longer time.

In another preferred embodiment, the cylindrical battery cell may be a secondary battery. The kind of the secondary battery is not particularly restricted. In a concrete example, the cylindrical battery cell may be a lithium secondary battery, such as a lithium ion secondary battery, a lithium polymer secondary battery, or a lithium ion polymer secondary battery, which exhibit high energy density, discharge voltage, and power stability.

In general, a lithium secondary battery includes a positive electrode, a negative electrode, a separator, and a lithium salt-containing non-aqueous electrolyte.

Hereinbelow, other components of the lithium secondary battery will be described.

Specifically, the positive electrode is manufactured, for example, by applying a positive electrode mix comprising a conductive material, a binder, and a positive electrode active material composed of positive electrode active material particles, on a positive electrode current collector. The positive electrode mix may include a filler, if necessary.

The positive electrode collector is generally fabricated to have a thickness of 3 µm to 201 µm. There is no particular limit to the positive electrode current collector, so long as it has high conductivity without causing any chemical changes in the fabricated battery. For example, the positive electrode current collector may be made of stainless steel, aluminum, nickel, titanium, and aluminum or stainless steel surface-treated with carbon, nickel, titanium, or silver. Preferably, the positive electrode current collector may be made of aluminum. If necessary, these positive electrode current collectors may also be processed to form fine irregularities on the surface thereof so as to enhance adhesion to the positive electrode active materials. In addition, the current collectors may be used in various forms including films, sheets, foils, nets, porous structures, foams and non-woven fabrics.

The positive electrode active material may be a layered compound, such as a lithium nickel oxide ($LiNiO_2$) or a compound replaced by one or more transition metals; a lithium manganese oxide represented by a chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiV_3O_4$, $V_2O_5$, or $Cu_2V_2O_7$; an Ni-sited lithium, nickel oxide represented by a chemical formula $LiNi_{1-x}M_xO_2$ (where M=Co, Mn, Al, Cu, Fe, Mg, B or Ga, and x=0.01 to 0.3); a lithium manganese composite oxide represented by a chemical formula $LiMn_{2-x}M_xO_2$ (where M=Co, Ni, Fe, Cr, Zn, or Ta, and x=0.01 to 0.1) or a chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$, in addition to the positive electrode active material particles, but is not limited thereto.

The conductive material is commonly added in an amount of 0.1% to 30% by weight, based on the total weight of the mixture including the positive electrode active material. Any conductive material may be used without particular limitation so long as it has suitable conductivity without causing any chemical changes in the fabricated secondary battery. The examples of the conductive materials that can be used in the present invention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder included in the positive electrode is a component which enhances binding of an active material to a conductive material and current collector. The binder is commonly added in an amount of 0.1 to 30% by weight, based on the total weight of the compound including the positive electrode active material. Examples of the binder include polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene propylene diene terpolymer (EPDM), sulfonated EPDM, styrene butadiene rubber, fluoro rubber and various copolymers.

The negative electrode is prepared by applying a negative electrode active material on a negative electrode current collector, followed by drying. The negative electrode active material may further include the afore-mentioned ingredients included in the positive electrode as needed.

The negative electrode current collector is generally fabricated to have a thickness of 3 µm to 500 µm. There is no particular limit to the negative electrode current collector, so long as it has suitable conductivity without causing any chemical changes in the fabricated battery. As examples of the negative electrode current collector, mention may be made of copper, stainless steel, aluminum, nickel, titanium, sintered carbon, and copper or stainless steel surface-treated with carbon, nickel, titanium or silver, and aluminum-cadmium alloys. Similar to the positive electrode current collector, if necessary, these negative electrode current collectors may also be processed to form fine irregularities on the surface thereof so as to enhance adhesion to the negative electrode active materials. In addition, the negative electrode current collectors may be used in various forms including films, sheets, foils, nets, porous structures, foams and non-woven fabrics.

In addition, examples of negative electrode active materials that can be used in the present invention include carbons such as hard carbons and graphite carbons; metal composite oxides such as $Li_xFe_2O_3(0 \leq x \leq 1)$, $Li_xWO_2$ $(0 \leq x \leq 1)$, $Sn_xMe_{1-x}Me'_yO_z$ (Me: Mn, Fe, Pb, Ge; Me': Al, B, P, Si, Group I, II and III elements of the Periodic Table, halogens; $0 < x \leq 1$; $1 \leq y \leq$; $1 \leq z \leq 8$); lithium metals; lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, $Bi_2O_5$ and the like; conductive polymers such polyacetylene; and Li—Co—Ni materials.

The separator is interposed between the positive electrode and negative electrode. As the separator, an insulating thin film having high ion permeability and mechanical strength is used. The separator typically has a pore diameter of 0.01 µm to 10 µm and a thickness of 5 µm to 300 µm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing and non-aqueous electrolyte may comprise a non-aqueous electrolyte and a lithium salt. As the non-aqueous electrolyte, a non-aqueous electrolytic solution, a solid electrolyte, and an inorganic solid electrolyte may be utilized, but is not limited thereto.

BEST MODE

Hereinafter, the present invention will be described with reference to the following example. This example is provided only for illustration of the present invention and should not be construed as limiting the scope of the present invention.

Example 1

80 g of polyethylene terephthalate resin, 2 g of butyl-4-hydroxybenzoate, which is an UV stabilizer, 8 g of pigment, and 10 g of nylon 66 were mixed together based on a total weight of a composition and melt-blended to prepare a resin composition. The resin composition was prepared in a cooling equipment by quench hardening method to manufacture a cylindrical heat-shrinkable tube in which an upper portion and a lower portion thereof were open.

Comparative Example 1

A heat-shrinkable tube was manufactured in the same manner as Example 1, except that a resin composition was prepared without using butyl-4-hydroxybenzoate, which is the UV stabilizer, and nylon 66.

Comparative Example 2

A heat-shrinkable tube was manufactured in the same manner as Example 1, except that a resin composition was prepared without using butyl-4-hydroxybenzoate, which is the UV stabilizer.

Comparative Example 3

A heat-shrinkable tube was manufactured in the same manner as Example 1, except that a resin composition was prepared without using nylon 66.

Experimental Example 1

Figure 1:
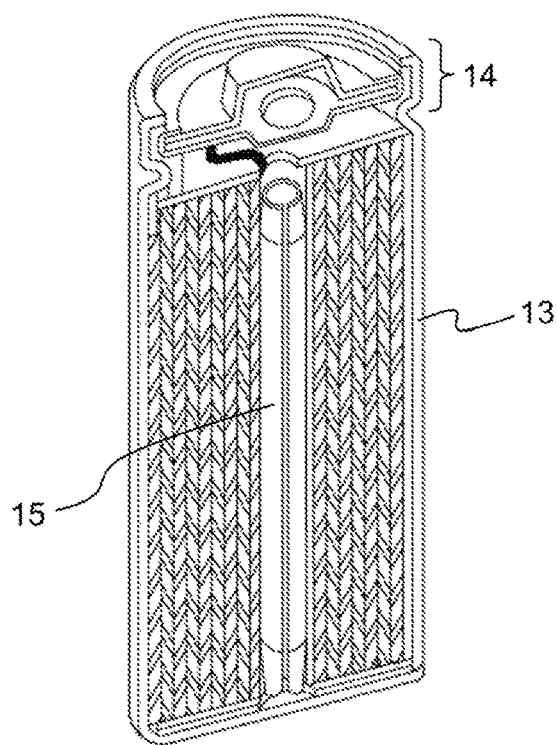
FIG. 1 is a vertical cross-sectional perspective view showing a conventional cylindrical battery.
Figure 2:
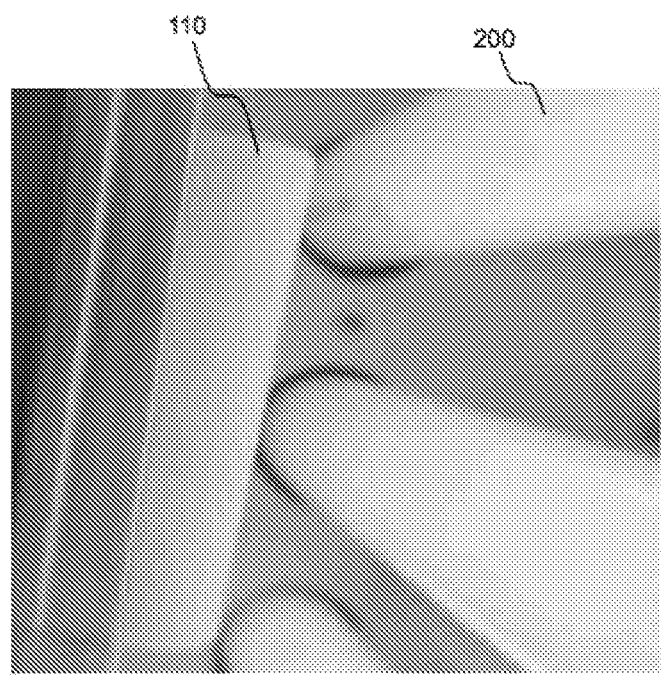
FIG. 2 is a photograph showing an experimental procedure of Experimental Example 1 of the present invention.

FIG. 2 of the present invention shows a photograph of an experimental procedure of Experimental Example 1. As shown in FIG. 2, heat-shrinkable tubes 110 according to Example 1 and Comparative Example 1 to Comparative Example 3 were disposed to be spaced apart from lamps of a UV irradiator 200 at a distance of 3 cm and were irradiated for 1,000 hours at an intensity of 61.5 W/m$^2$, at a wavelength of 300 nm to 400 nm, and at a temperature of 50 celsius degrees. Then, it was confirmed whether or not cracking occured on surfaces of the tubes.

TABLE 1

|  | Cracking occurred (◯ or X) |
| --- | --- |
| Example 1 | X |
| Comparative Example 1 | ◯ |
| Comparative Example 2 | X |
| Comparative Example 3 | X |

Referring to Table 1, cracking occurred in the heat-shrinkable tube according to Comparative Example 1, which was lacking nylon and an UV stabilizer. On the other hand, in the heat-shrinkable tubes according to Example 1, Comparative Example 2, and Comparative Example 3, cracking did not occur after ultraviolet irradiation for 1,000 hours. That is, when a nylon resin is added to a base material for tubes, which is a polyester resin, as in Comparative Example 2, cracking on the heat-shrinkable tube can be prevented due to the inherent elasticity of nylon. In addition, when an UV stabilizer is added to the base material for tubes, which is a polyester resin, as in Comparative Example 3, the UV stabilizer inhibits a chain reaction of free radicals generated by cleavage of polymer chains of the nylon resin and the polyester resin whereby it is possible to prevent cracking.

Furthermore, when a nylon resin and an UV stabilizer are added to the base material for tubes, which is a polyester resin, as in Example 1, it is possible to further prevent the formation of cracks in the heat-shrinkable tube due to the synergistic effect thereof.

Figures 3, 4:
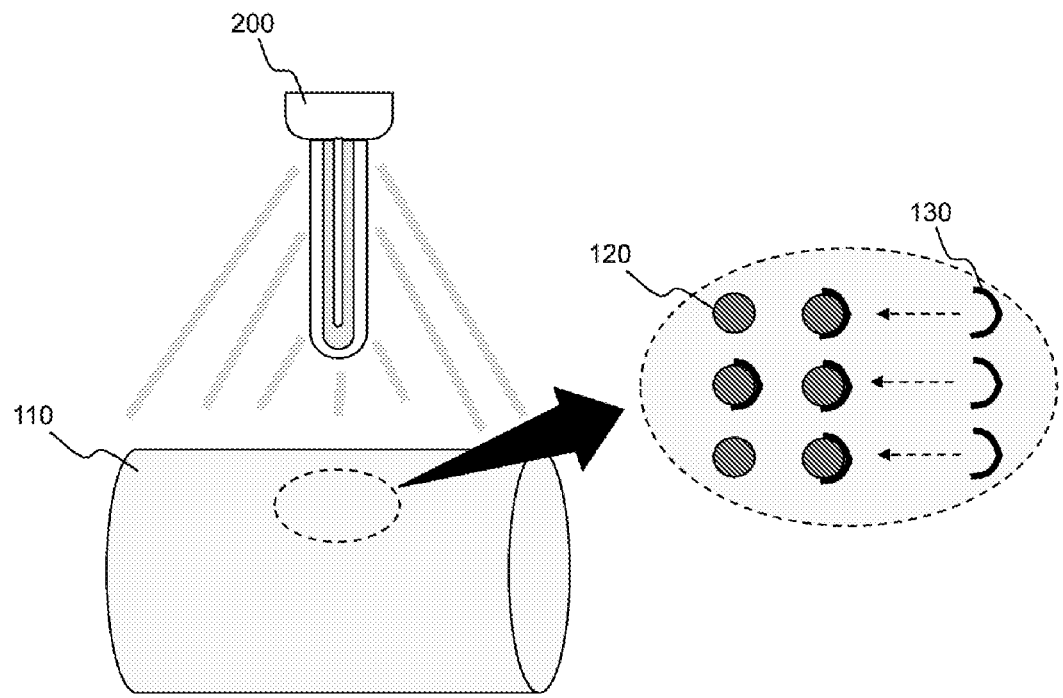
FIG. 3 is a schematic view showing a mechanism of a UV stabilizer included in a heat-shrinkable tube of the present invention.
FIG. 4 depicts photographs showing a result of a heat-shrinkable tube according to Example 1 in Experimental Example 2.

Meanwhile, FIG. 3 shows a schematic view of a mechanism of the UV stabilizer included in the heat-shrinkable tube of the present invention. Referring to FIG. 3, a free radical 120 reacts with a UV stabilizer 130 whereby a chain reaction of the free radical 120 can be suppressed, the free radical 120 generated by cleavage of polymer chains of the nylon resin and the polyester resin in which the polymer chains are cut by an ultraviolet ray radiated from the UV irradiator 200 to the heat-shrinkable tube 110.

Experimental Example 2

The heat-shrinkable tube according to Example 1 and the heat-shrinkable tube according to Comparative Example 2 were prepared and surfaces of the tubes were printed with black writing. The heat-shrinkable tubes were irradiated for 500 hours by the UV irradiator at an intensity of 61.5 W/m$^2$ and at a wavelength of 300 nm to 400 nm. Then, color changes of the black writing were confirmed, and the results are shown in FIGS. 4 and 5.

Figures 5, 6:
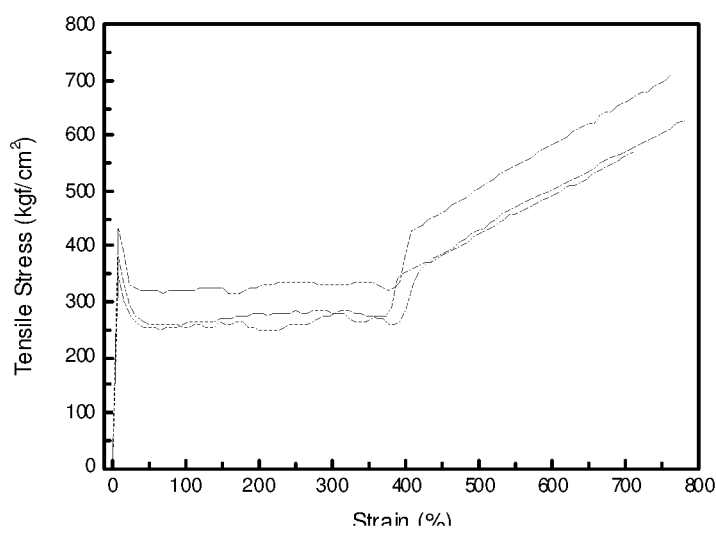
FIG. 5 depicts photographs showing a result of a heat-shrinkable tube according to Comparative Example 2 in Experimental Example 2.
FIG. 6 is a graph showing stress-strain curves (S-S curves) of heat-shrinkable tubes according to Example 1 in Experimental Example 3.

FIG. 4 shows color changes of the heat-shrinkable tube according to Example 1 and FIG. 5 shows color changes according to Comparative Example 2.

Referring to FIGS. 4 and 5, color of the writing on the heat-shrinkable tube according to Example 1 rarely changed after irradiation with an ultraviolet ray. On the other hand, color of the writing on the heat-shrinkable tube according to Comparative Example 2 changed from black to grey, which was blurred. Therefore, it was confirmed that when the heat-shrinkable tube contains the UV stabilizer, color of the tube does not change, but when the tube does not contain the UV stabilizer, color of the tube changes remarkably.

Experimental Example 3

Three heat-shrinkable tubes according to Example 1 and three heat-shrinkable tubes according to Comparative Example 3 were prepared and a universal test machine was used to measure tensile strengths and percentage strains thereof.

Specimens of the tubes, which are insulating exteriors, were placed in the universal test machine and strained at a constant speed to measure tensile strengths and percentage strains of the specimens whereby stress-strain curves (S-S curves) were obtained. The results of the tubes according to Example 1 are shown in FIG. 6, the result of the tubes according to Comparative Example 3 are shown in FIG. 7, and the detail values are shown in below Table 2.

TABLE 2

|  | Example 1 | Comparative Example 3 |
| --- | --- | --- |
| Tensile strength (Kgf/cm$^2$) | 636 (average) | 569 (average) |
| Percentage strain (%) | 750 (average) | 683 (average) |

Figure 7:
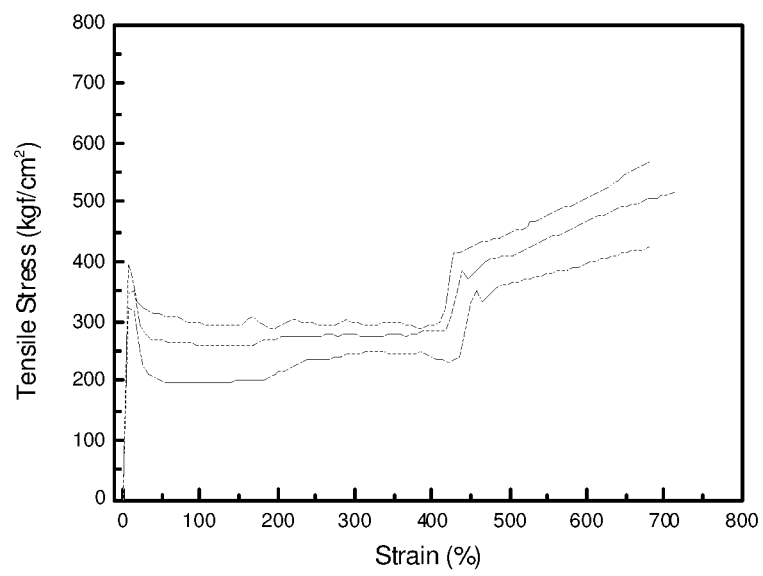
FIG. 7 is a graph showing stress-strain curves (S-S curves) of heat-shrinkable tubes according to Comparative Example 3 in Experimental Example 3.

Referring to Table 2, FIGS. 6 and 7, the tensile strength and the percentage strain of the heat-shrinkable tube according to Example 1 show remarkably improved values compared with the heat-shrinkable tube according to Comparative Example 3. Therefore, it was confirmed that the heat-shrinkable tube containing the UV stabilizer and the nylon has improved mechanical strength compared to the heat-shrinkable tube without nylon. It is considered that this is because the heat-shrinkable tube according to Example 1 includes of nylon, which has high tensile strength and elasticity.

As shown above, the base material for the heat-shrinkable tube of the present invention contains the nylon resin and the UV stabilizer, and cracking is inhibited in the heat-shrinkable tube containing any one of the nylon resin and the UV stabilizer. In addition, it was confirmed that when the heat-shrinkable tube contains the nylon resin but not the UV stabilizer, the tensile strength and the percentage strain thereof can be improved, but color thereof remarkably changes upon irradiation by ultraviolet rays.

That is, the present invention generates synergy by containing the nylon resin and the UV stabilizer together, whereby cracking on the tube and color change by ultraviolet rays can be prevented.

Although a preferred embodiment of the present invention has been described for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, the heat-shrinkable tube of the cylindrical battery cell according to the present invention includes the UV stabilizer that inhibits a chain reaction of free radicals generated by cleavage of polymer chains of the nylon resin and the polyester resin in which the polymer chains are cut by an ultraviolet ray irradiated to the heat-shrinkable tube such that the tube is not damaged or discolored even when the heat-shrinkable tube is exposed to ultraviolet rays for a long time, which means that the inherent insulating function can be maintained and the exterior of the battery can be protected.

In addition, the heat-shrinkable tube of the cylindrical battery cell according to the present invention includes a supplement, which is the nylon resin, that increases the tensile strength and operating temperature of the heat-shrinkable tube whereby when exposed to a high temperature or external impact, deformation of the tube can be prevented.

The invention claimed is:

1. A cylindrical battery cell in which a heat-shrinkable tube wraps an outer surface of a cylindrical case of the cylindrical battery cell except electrode terminals, the heat-shrinkable tube comprising: a base material, which is a polyester resin, capable of shrinking by heat; a supplement, which is a nylon resin for increasing tensile strength and operating temperature of the heat-shrinkable tube; and an ultraviolet stabilizer for inhibiting a chain reaction of free radicals generated by cleavage of polymer chains of the nylon resin or the polyester resin when the heat-shrinkable tube is exposed to an ultraviolet ray irradiation, wherein the ultraviolet stabilizer is butyl-4-hydroxybenzoate, wherein the ultraviolet stabilizer is included in an amount of 0.1 wt % to 5 wt %, based on a total weight of the heat-shrinkable tube, wherein the heat-shrinkable tube has no cracking when irradiated for 1,000 hours at an intensity of 61.5 W/m$^2$ and at a wavelength of 300 nm to 400 nm, wherein the heat-shrinkable tube is 1 µm to 100 µm in thickness, and wherein the heat-shrinkable tube is one layer.

2. The cylindrical battery cell of claim 1, wherein the heat-shrinkable tube further comprises a coloration pigment.

3. The cylindrical battery cell of claim 1, wherein the polyester resin is a polyethylene terephthalate resin.

4. The cylindrical battery cell of claim 3, wherein the polyester resin is included in an amount of 70 wt % to 90 wt %, based on a total weight of the heat-shrinkable tube.

5. The cylindrical battery cell of claim 1, wherein the nylon resin is included in an amount of 3 wt % to 10 wt %, based on a total weight of the heat-shrinkable tube.

6. The cylindrical battery cell of claim 2, wherein the pigment is included in an amount of 10 wt % to 20 wt %, based on a total weight of the heat-shrinkable tube.

7. The cylindrical battery cell of claim 1, wherein the nylon resin is included in the polyester resin as a blended state.

8. The cylindrical battery cell of claim 1, wherein the heat-shrinkable tube further comprises an ultraviolet absorber that absorbs radiated ultraviolet rays and emits absorbed energy as heat energy.

9. The cylindrical battery cell of claim 8, wherein the ultraviolet absorber is a benzophenone-based compound.

* * * * *